United States Patent [19]
Janca et al.

[11] Patent Number: 5,734,240
[45] Date of Patent: Mar. 31, 1998

[54] BIDIRECTIONAL DC MOTOR

[75] Inventors: Reiner Janca, Dorsten; Uwe Borgmann, Recklinghausten, both of Germany

[73] Assignee: Leopold Kostal GmbH & Co. KG, Germany

[21] Appl. No.: 629,259

[22] Filed: Apr. 8, 1996

[30] Foreign Application Priority Data

Apr. 17, 1995 [DE] Germany .................. 195 13 094.4

[51] Int. Cl.$^6$ .................................................. H02P 1/00
[52] U.S. Cl. .................. 318/280; 318/292; 318/541; 318/542; 388/836
[58] Field of Search ........................... 318/280, 292, 318/541, 542; 388/836

[56] References Cited

U.S. PATENT DOCUMENTS

| | | | |
|---|---|---|---|
| 4,367,887 | 1/1983 | Takada | 318/292 X |
| 4,827,897 | 5/1989 | Yamada et al. | 388/836 X |
| 4,997,237 | 3/1991 | Ricker et al. | 318/292 X |

*Primary Examiner*—Karen Masih
*Attorney, Agent, or Firm*—Brooks & Kushman P.C.

[57] ABSTRACT

A bidirectional DC motor comprising a commutator (6) which can be connected to a constant voltage source by a first and a second brush. The second brush is disposed opposite one side of the first brush in a spaced disposition with respect to the periphery of the commutator, which spacing correlates with a desired motor characteristic to provide a relatively convenient arrangement for switching the direction of rotation of a DC motor. In addition to the second brush (8) provided for one direction of rotation, the commutator (6) also has a third brush (9) for the counter-direction of rotation and is disposed in a spaced disposition with respect to the periphery of the commutator (6), which spacing correlates with the desired motor characteristic for the counter-direction of rotation. The first brush (7) is connected to one pole (+) of the constant voltage source (10) and the two other brushes (8, 9) are connected to the other pole (−) of the constant voltage source (10) by a switch (S1, S2) respectively.

12 Claims, 1 Drawing Sheet

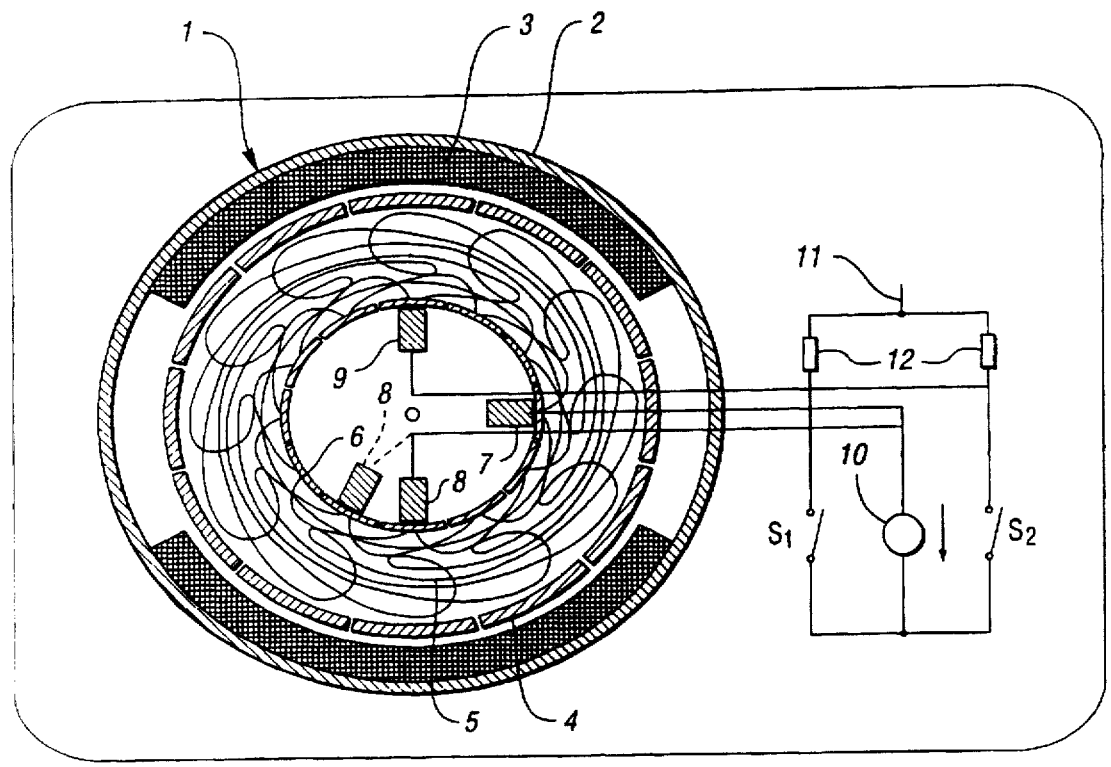
Fig. 1
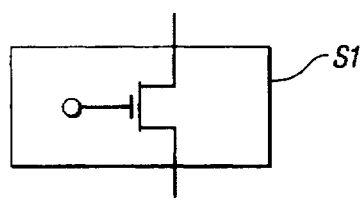 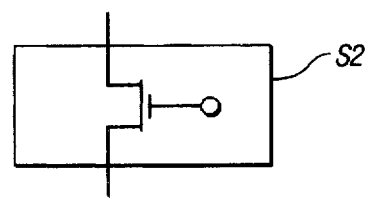
Fig. 2A  Fig. 2B

5,734,240

BIDIRECTIONAL DC MOTOR

TECHNICAL FIELD

The present invention relates to a bidirectional DC motor comprising a commutator which can be connected to a constant voltage source by brushes located in a spaced relationship around the periphery of a commutator to provide a desired motor characteristic.

BACKGROUND ART

DC motors are used in actuating drives and in particular are installed in motor vehicles for systems which raise windows adjust the sun roofs seat positions and operate windscreen wipers. The direction of rotation of these DC motors is switched by reversing the operating voltage by means of a suitable control device which is designed as a semi-conductor bridge circuit. A circuit of this type is comparatively expensive.

SUMMARY OF THE INVENTION

The object of the invention is to provide a relative convenient arrangement for the purpose of switching the direction of rotation of a DC motor.

This object is achieved according to the invention by the fact that in addition to a second brush provided for one direction of rotation, the commutator also has a third brush which is provided for the counter-direction of rotation and which is disposed in a spaced disposition with respect to the periphery of the commutator. This spacing in turn correlates with the desired motor characteristic in the counter-direction of rotation, wherein the first brush is connected to one pole of the constant voltage source and the two other brushes are connected in each case by way of a switch to the other pole of the constant voltage source.

Although it is known in connection with DC motors to allocate a third brush to the commutator, this is merely provided for the purpose of achieving a different motor rotational speed.

The invention differs from the prior art in that a separate electrical circuit is provided in each case for the right-handed rotation and for the left-handed rotation. Thus, it is not necessary to reverse the voltage supply. In this manner, it is possible to allocate an evaluating circuit for the purpose of determining the direction of rotation and/or the rotational speed and also the adjustment path. This is based preferably on the fact that the periodic voltage oscillations on the commutator are detected.

It is particularly favorable in the case of the invention that the two brushes which, for the purpose of achieving the two directions of rotation of the DC motor, are provided on one side and the other side of the (first) brush in such a manner that consequently different characteristics are allocated to the right-hand rotation and the left-hand rotation.

Further advantageous embodiments of the subject matter in accordance with the invention are indicated in the subordinate claims and are further explained with reference to an embodiment illustrated in the drawing.

BRIEF DESCRIPTION OF THE DRAWINGS

FIG. 1 is a schematic illustration of a bidirectional DC motor according to the present invention; and FIGS. 2A and 2B are schematic illustrations of switches for the bidirectional DC motor.

BEST MODE(S) FOR CARRYING OUT THE INVENTION

As is evident from the drawing, a DC motor 1 consists of a stator 2 which is equipped with magnetic components 3. Disposed in the said stator is an armature 4 which is provided with electrical windings 5. The armature includes a commutator 6. Three (carbon)brushes 7, 8, 9 which consist of graphite are allocated to the commutator 6.

A first brush 7 is connected to the positive pole (+) of the voltage source 10, e.g. to the voltage supply network of a motor vehicle. The second brush 8 disposed opposite one side of the first brush 7 in a spaced disposition dependent upon the desired motor characteristic is connected by way of a switch S1 to the negative pole—(earth) of the voltage supply 10 and fixes, together with the first brush 7, one direction of rotation of the DC motor. The third brush 9 disposed opposite the other side of the first brush 7—again in a spaced disposition dependent upon the desired motor characteristic—is likewise connected by way of a switch S2 to earth and together with the brush 7 fixes the counter-direction of rotation.

The control can be achieved either by virtue of a single-pole relay (as shown in FIG. 1) or a semi-conductor component (as shown in FIGS. 2A and 2B, wherein in conjunction with the latter it is especially favorable that the earth-side connection guarantees a relatively convenient structure. Special consideration can be given to a field-effect transistor as the semiconductor component. The switches can also be integrated into the motor so that a convenient connection method is produced.

The second brush 8 and the third brush 9 are connected in each case by way of a resistance 12 to one line 11 which leads to an evaluating circuit provided for the purpose of detecting the direction of rotation and/or the rotational speed. This evaluating circuit evaluates the voltage oscillations occurring periodically on the commutator 6. The periodicity of this signal is produced from the rotational speed x number of poles. The resolution is correspondingly large. The position of the object being adjusted can be detected precisely by the integration which is dependent upon the direction of rotation. The rotational speed can also be calculated with a high resolution.

While the best modes for carrying out the invention have been described in detail, those familiar with the art to which this invention relates will recognize various alternative designs and embodiments for practicing the invention as defined by the following claims.

What is claimed is:

1. A bidirectional DC motor comprising:

a commutator (6);

a constant voltage supply (10) having a first pole and a second pole such that the constant voltage source has a given polarity;

a first brush (7) connecting the commutator (6) to the first pole of the constant voltage source (10);

a second brush (8) being connectable to the second pole of the constant voltage source (10) by a switch (S1) for providing a direction of rotation of the DC motor, the second brush (8) being disposed opposite one side of the first brush (7) in a spaced disposition with respect to the periphery of the commutator (6), such spacing correlating to a desired motor characteristic in the direction of rotation, wherein a first electrical circuit is formed when the switch (S1) connects the second brush (8) to the second pole of the constant voltage source (10); and a third brush (9) being connectable to the second pole of the constant voltage source (10) for providing a counter-direction of rotation of the DC motor, the third brush (9) being disposed opposite the other side of the first brush (7) in a spaced disposition with respect to the periphery of the commutator (6), such spacing correlating to a desired motor characteristic in the counter-direction of rotation, wherein a second electrical circuit is formed when the switch (S2) connects the third brush (9) to the second pole of the constant voltage source (10);

wherein the constant voltage source (10) has the same given polarity in the first and second electrical circuits to enable an evaluating circuit to be connected to the second and third brushes (8, 9) for evaluating the motor characteristics of the DC motor in both directions of rotation by detecting periodic voltage oscillations on the commutator (6).

2. A bidirectional DC motor according to claim 1, wherein the second brush (8) is disposed opposite the first brush (7) in a spaced disposition which corresponds to the spacing existing between the third brush (9) and the first brush (7).

3. A bidirectional DC motor according to claim 1, wherein the second brush (8) is disposed opposite the first brush (7) in a spaced disposition which differs with respect to the spacing existing between the third brush (9) and the first brush (7).

4. (Amended) A bidirectional DC motor according to claim 1, wherein the first pole is a positive pole and the second pole is a ground pole, wherein the first brush (7) is connected to the positive pole and the second and third brushes (8, 9) are connectable to the ground pole by the two switches (S1, S2) respectively.

5. (Amended) A bidirectional DC motor according to claim 2, wherein the first pole is a positive pole and the second pole is a ground pole, wherein the first brush (7) is connected to the positive pole and the second and third brushes are connectable to the ground pole by the two switches (S1, S2) respectively.

6. A bidirectional DC motor according to claim 3, wherein the first pole is a positive pole and the second pole is a ground pole, wherein the first brush (7) is connected to the positive pole and the second and third brushes are connectable to the ground pole by the two switches (S1, S2) respectively.

7. A bidirectional DC motor according to claim 4, wherein the two switches (S1, S2) consist of a semi-conductor switching component.

8. A bidirectional DC motor according to claim 7, wherein the two switches (S1, S2) consist of a field effect transistor.

9. A bidirectional DC motor according to claim 1, wherein the second and third brushes (8, 9) are connected by a line (11) to an evaluating circuit which detects the direction of rotation of the DC motor.

10. A bidirectional DC motor according to claim 1, wherein the second and third brushes (8, 9) are connected by a line (11) to an evaluating circuit which detects the rotational speed of the commutator (6).

11. A bidirectional DC motor according to claim 1, wherein the second and third brushes (8, 9) are connected by a line (11) to an evaluating circuit which detects the position of an object being adjusted by the DC motor.

12. A bidirectional DC motor according to claim 1, wherein the second and third brushes (8, 9) are connected by a line (11) to an evaluating circuit which evaluates periodic voltage oscillations occurring on the commutator (6) to evaluate the motor characteristics of the DC motor in both directions of rotation.

* * * * *